United States Patent
Torichigai et al.

(10) Patent No.: US 10,507,430 B2
(45) Date of Patent: Dec. 17, 2019

(54) HOLLOW FIBER MEMBRANE SHEET-LIKE OBJECT, METHOD OF MANUFACTURING HOLLOW FIBER MEMBRANE SHEET-LIKE OBJECT, HOLLOW FIBER MEMBRANE SHEET LAMINATE, METHOD OF MANUFACTURING HOLLOW FIBER MEMBRANE SHEET LAMINATE, HOLLOW FIBER MEMBRANE MODULE AND METHOD OF MANUFACTURING HOLLOW FIBER MEMBRANE MODULE

(71) Applicant: Mitsubishi Chemical Corporation, Tokyo (JP)

(72) Inventors: Tetsuya Torichigai, Toyohashi (JP); Makoto Ideguchi, Toyohashi (JP); Nobuyasu Ueno, Toyohashi (JP); Toshinori Tanaka, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 134 days.

(21) Appl. No.: 15/300,403

(22) PCT Filed: Apr. 3, 2015

(86) PCT No.: PCT/JP2015/060605
§ 371 (c)(1),
(2) Date: Sep. 29, 2016

(87) PCT Pub. No.: WO2015/152401
PCT Pub. Date: Oct. 8, 2015

(65) Prior Publication Data
US 2017/0182462 A1    Jun. 29, 2017

(30) Foreign Application Priority Data
Apr. 3, 2014   (JP) ................. 2014-077234

(51) Int. Cl.
*B01D 63/02* (2006.01)
*B01D 69/08* (2006.01)
(Continued)

(52) U.S. Cl.
CPC ......... *B01D 63/021* (2013.01); *B01D 63/022* (2013.01); *B01D 63/026* (2013.01);
(Continued)

(58) Field of Classification Search
CPC ........ B01D 61/08; B01D 61/18; B01D 63/02; B01D 63/021; B01D 63/022;
(Continued)

(56) References Cited

U.S. PATENT DOCUMENTS 6,271,023 B1    8/2001  Baurmeister et al.
2001/0037967 A1  11/2001  Rabie et al.
(Continued)

FOREIGN PATENT DOCUMENTS

EP    1 994 976 A1    11/2008
JP    61-1 71 503 A    8/1986
(Continued)

OTHER PUBLICATIONS

English language machine translation of JP 2002-263454, 8 Pages, No Date.*

(Continued)

*Primary Examiner* — Pranav N Patel
(74) *Attorney, Agent, or Firm* — Oblon, McClelland, Maier & Neustadt, L.L.P.

(57) ABSTRACT

A hollow fiber membrane sheet-like object in which a plurality of hollow fiber membranes is aligned in parallel with each other and fixed to each other while both end faces of each of the hollow fiber membranes in a longitudinal direction are open, wherein at least one belt-like binding portion made of an elastic body having an elongation (Continued)

percentage (E) stipulated by JIS K6251 of 100% or more and extending in a direction perpendicular to the longitudinal direction is formed at each of both end portions of the hollow fiber membrane sheet-like object, and the plurality of hollow fiber membranes is fixed to each other.

3 Claims, 14 Drawing Sheets

(51) Int. Cl.
 *B31C 3/00* (2006.01)
 *B01D 65/00* (2006.01)
(52) U.S. Cl.
 CPC .............. *B01D 69/087* (2013.01); *B31C 3/00* (2013.01); *B01D 65/00* (2013.01); *B01D 2313/025* (2013.01)
(58) Field of Classification Search
 CPC .... B01D 63/023; B01D 63/04; B01D 63/043; B01D 63/08; B01D 63/081; B01D 2313/025; B01D 2313/04; B01D 2313/23
 See application file for complete search history.

(56) References Cited

U.S. PATENT DOCUMENTS

| | | | |
|---|---|---|---|
| 2002/0153299 A1 | 10/2002 | Mahendran et al. | |
| 2003/0173706 A1 | 9/2003 | Rabie et al. | |
| 2004/0060442 A1* | 4/2004 | Nakahara | B01D 63/02 96/8 |
| 2004/0182771 A1 | 9/2004 | Mahendran et al. | |
| 2005/0184002 A1 | 8/2005 | Pedersen | |
| 2007/0144716 A1* | 6/2007 | Doh | B01D 63/02 165/158 |
| 2010/0000938 A1* | 1/2010 | Szabo | B01D 63/022 210/496 |
| 2011/0062074 A1 | 3/2011 | Ishibashi et al. | |
| 2014/0327179 A1 | 11/2014 | Szabo et al. | |
| 2015/0060348 A1 | 3/2015 | Ideguchi et al. | |

FOREIGN PATENT DOCUMENTS

| | | |
|---|---|---|
| JP | 9-24253 A | 1/1997 |
| JP | 2000-84373 | 3/2000 |
| JP | 2000-140841 | 5/2000 |
| JP | 2002-263454 | 9/2002 |
| JP | 2009-18283 A | 1/2009 |
| WO | WO 2007/127768 A1 | 11/2007 |
| WO | WO 2009/148088 A1 | 12/2009 |
| WO | WO2013003010 * | 1/2013 |
| WO | WO 2013/146080 A1 | 10/2013 |
| WO | WO 2013/151051 A1 | 10/2013 |

OTHER PUBLICATIONS

Extended European Search Report dated Jun. 8, 2017 in Patent Application No. 15773863.4
Supplementary Search Report dated Feb. 23, 2017 in European Patent Application No. 15773863.4.
International Search Report dated May 26, 2015 in PCT/JP2015/060605, filed Apr. 3, 2015.
Office Action as received in the corresponding European Patent Application No. 15773863.4 dated Jun. 19, 2018.
Japanese Notice of Allowance dated Aug. 1, 2017, Japanese Patent Application No. 2016-162031 (with Machine Translated English-language Translation).

* cited by examiner

[Fig. 1]
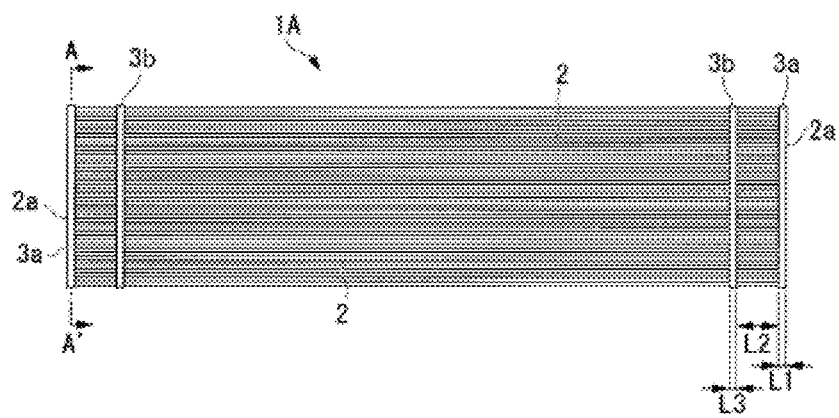
[Fig. 2]
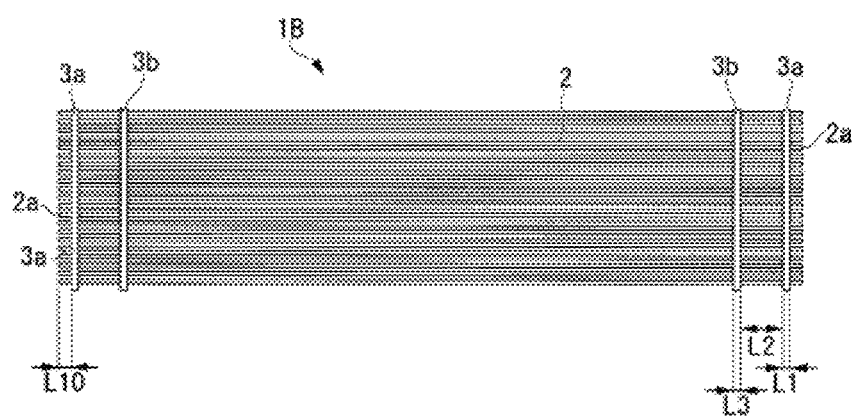
[Fig. 3]
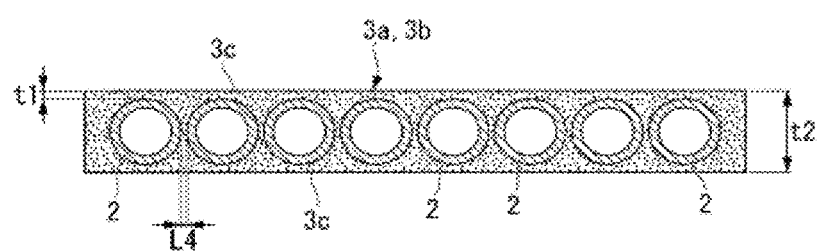

[Fig. 4]
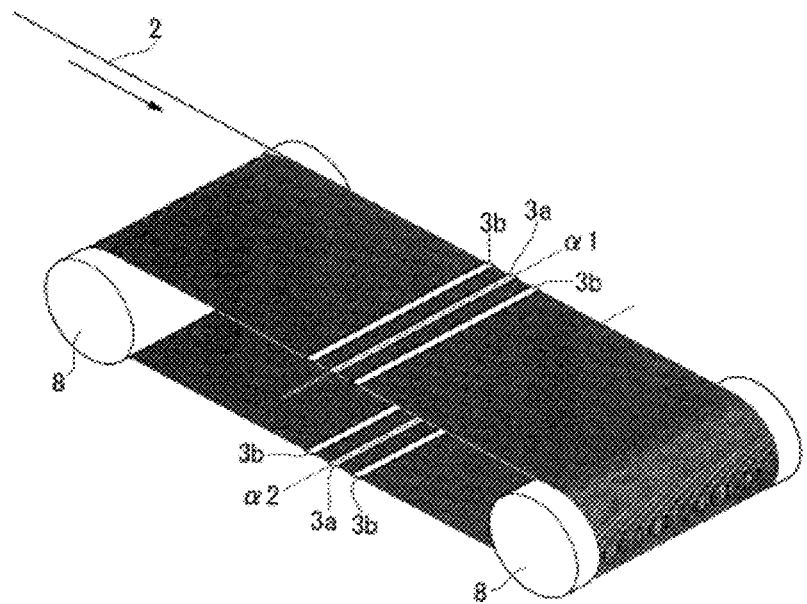
[Fig. 5]
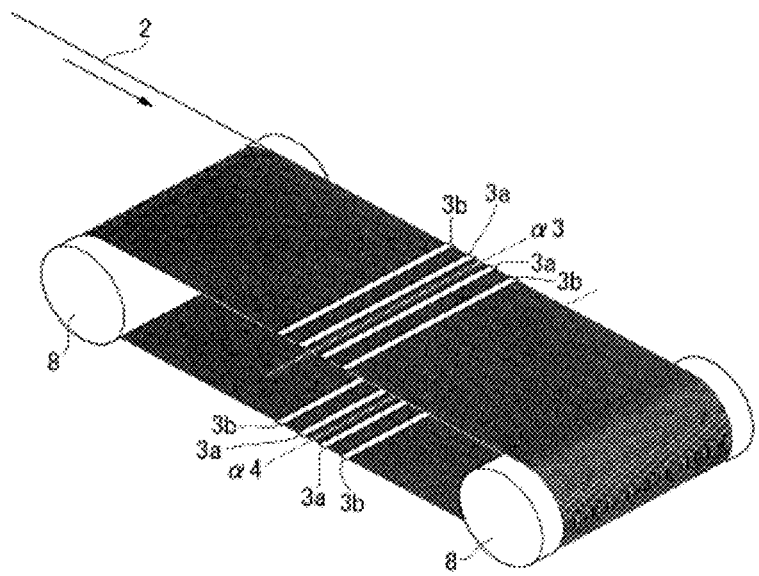

[Fig. 6]
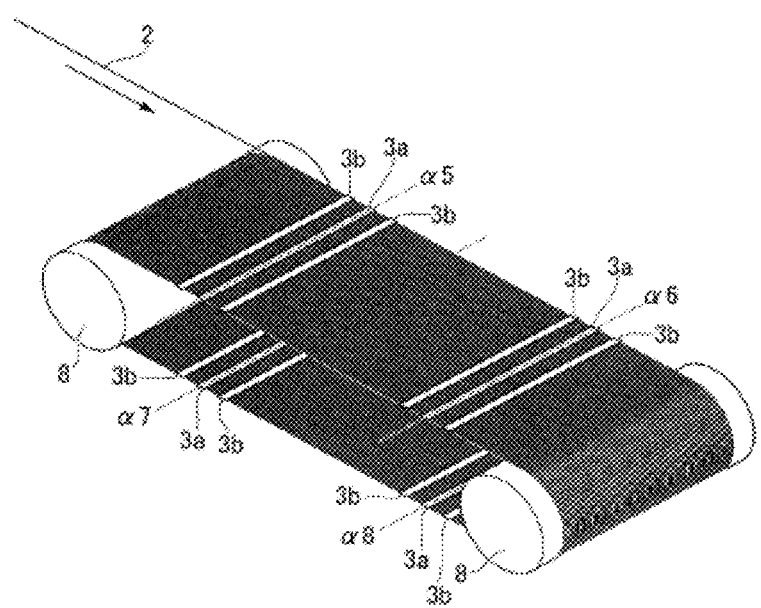

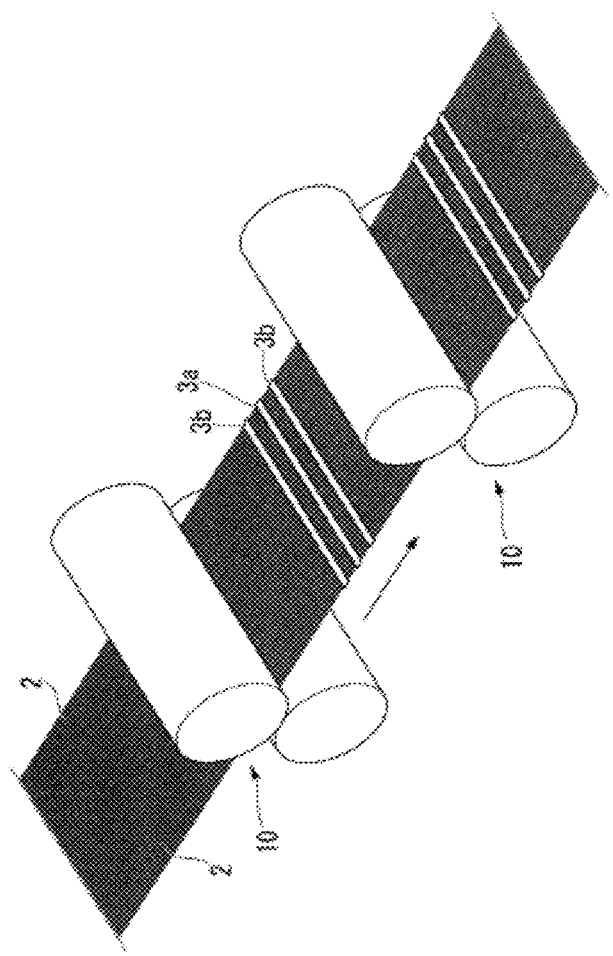
[Fig. 7]

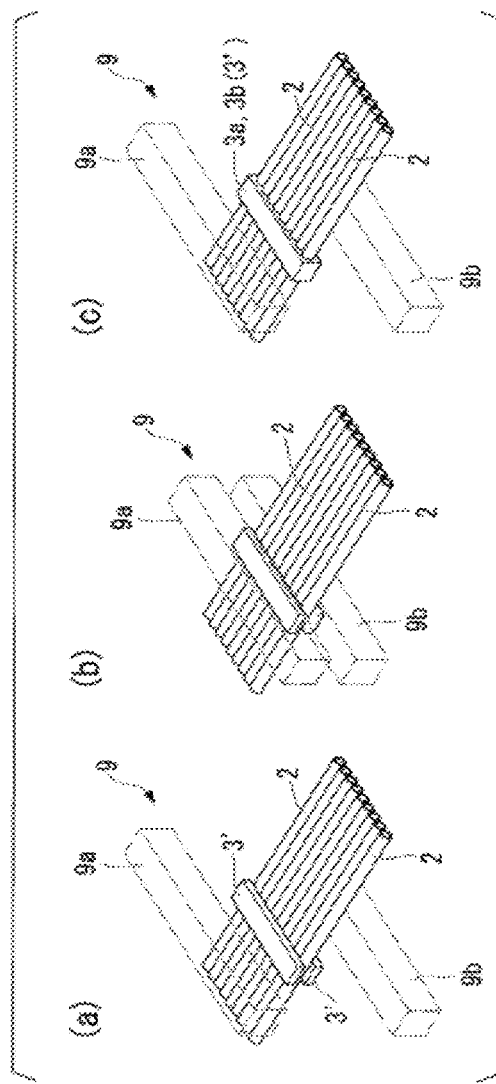

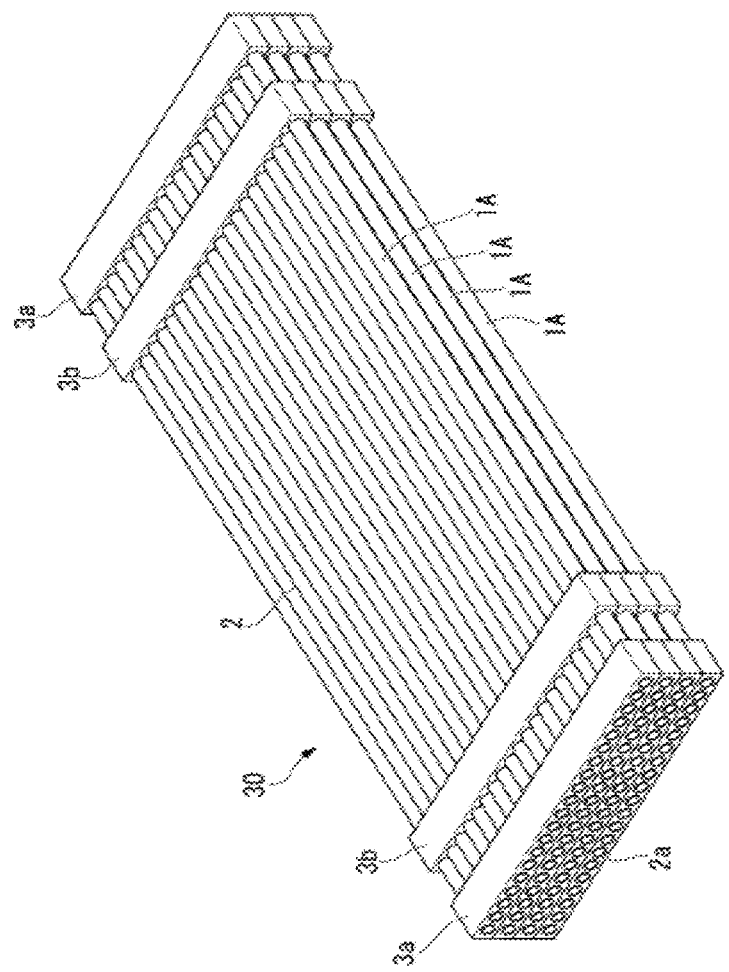
[Fig. 9]

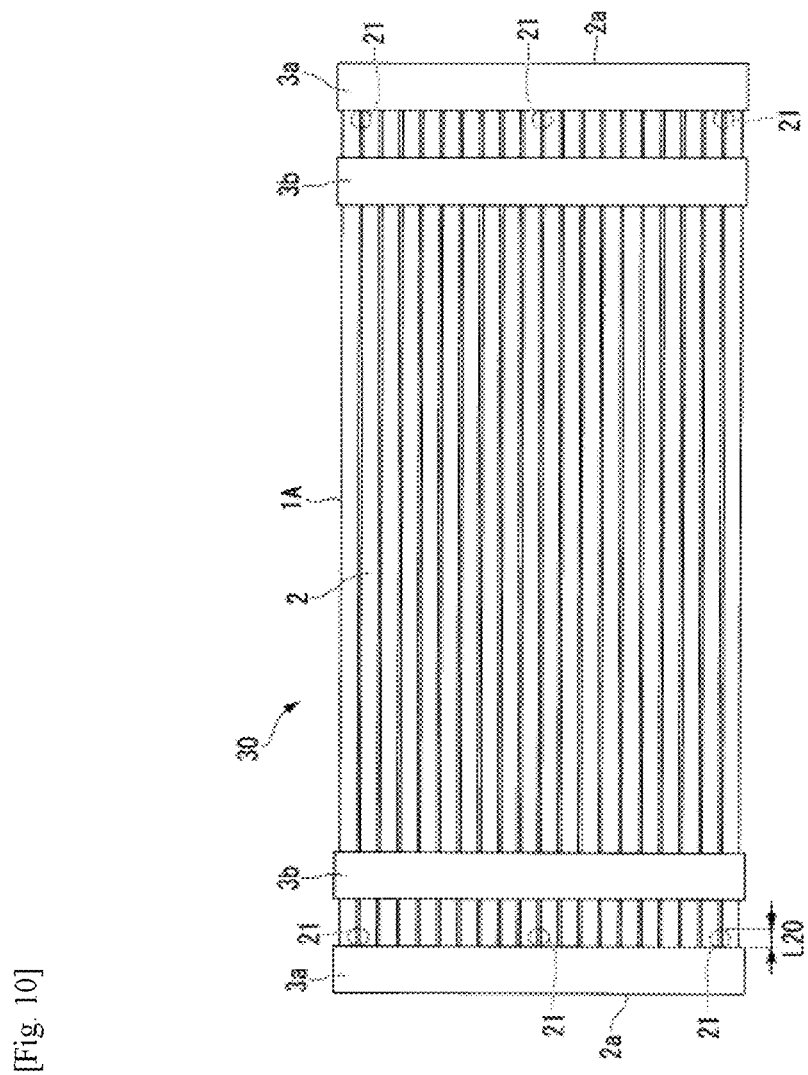
[Fig. 10]

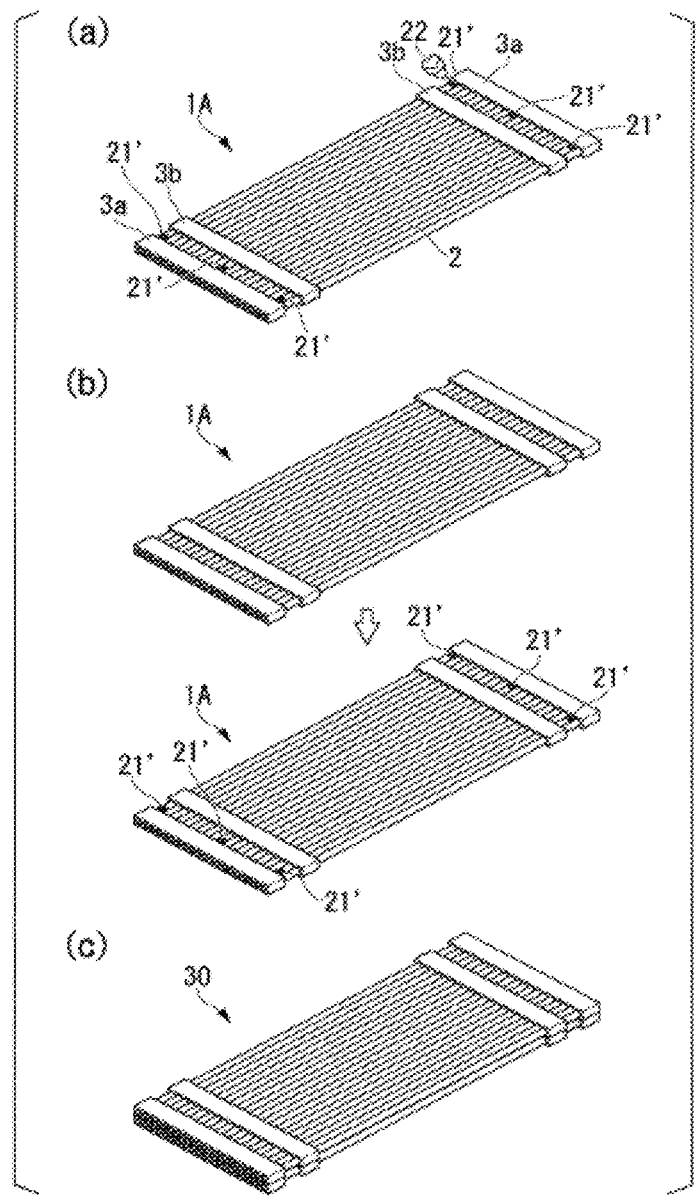
[Fig. 11]

[Fig. 12]
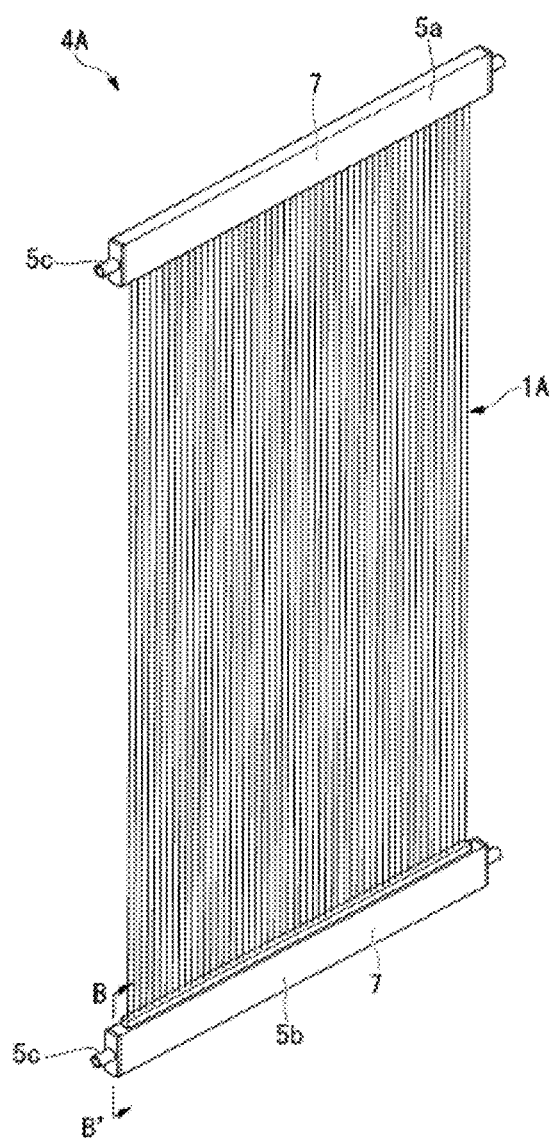

[Fig. 13]
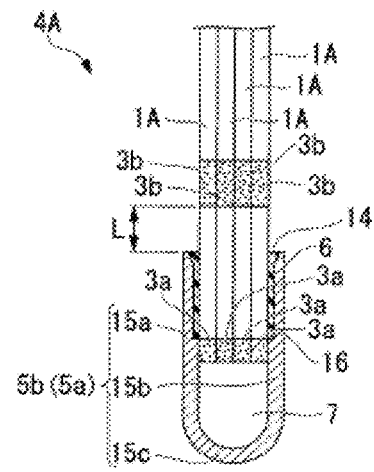
[Fig. 14]
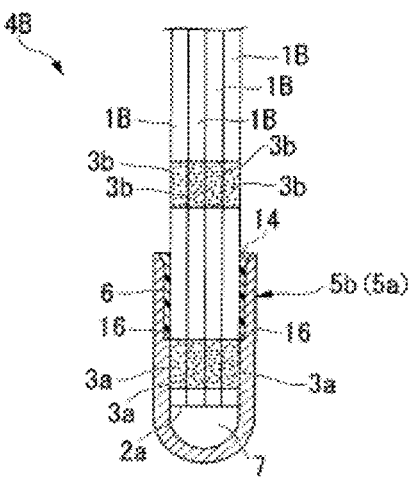

[Fig. 15]
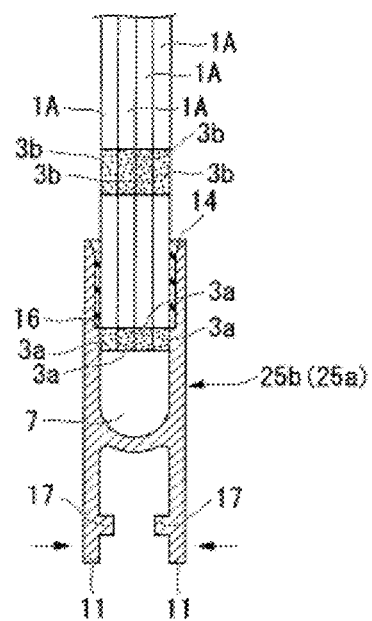
[Fig. 16]
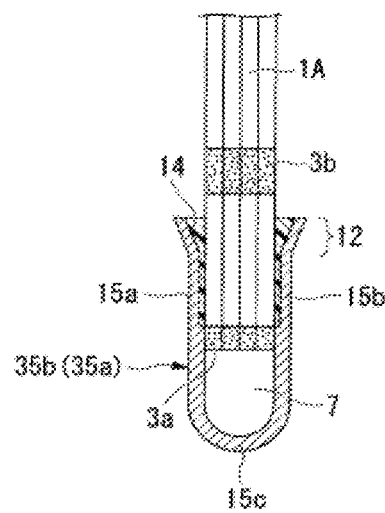

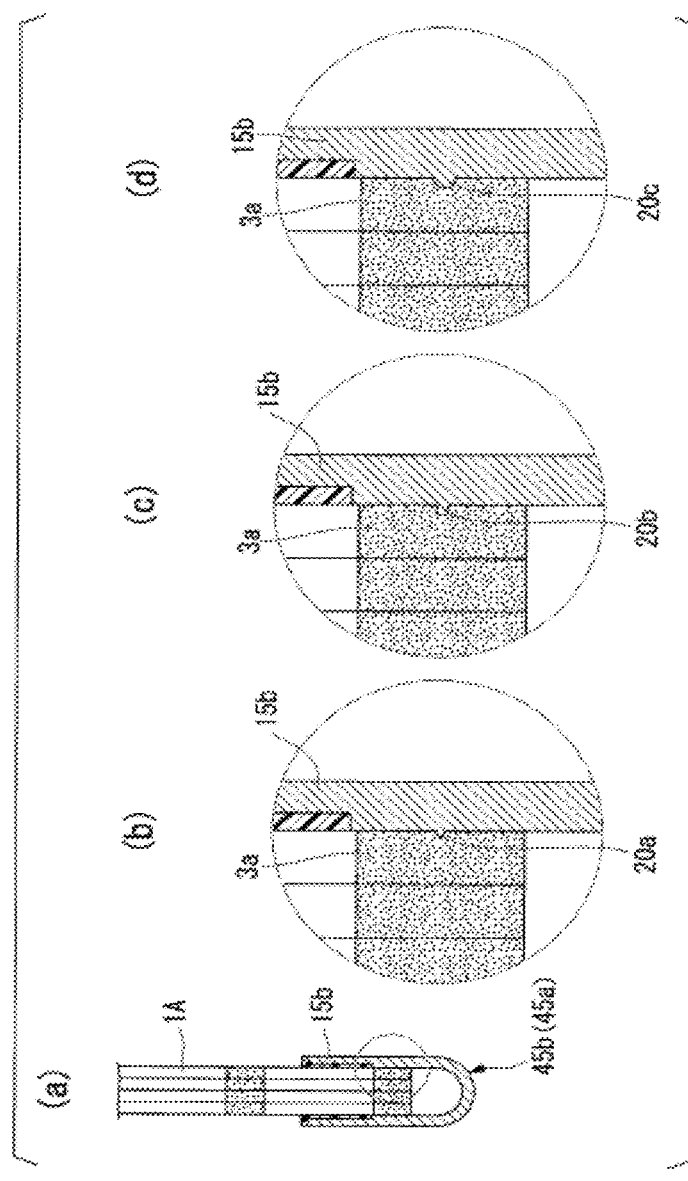
[Fig. 17]

[Fig. 18]
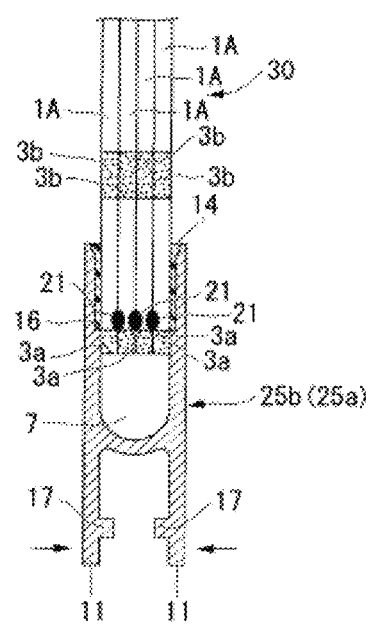

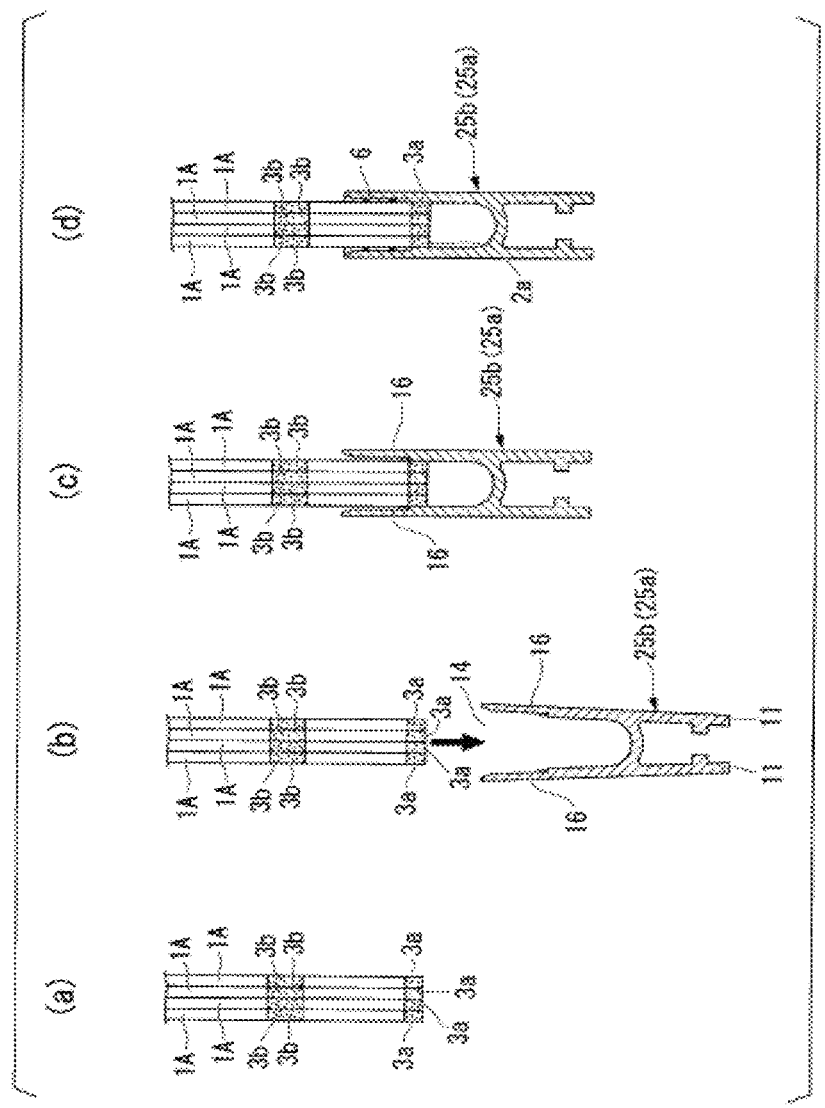
[Fig. 19]

HOLLOW FIBER MEMBRANE SHEET-LIKE OBJECT, METHOD OF MANUFACTURING HOLLOW FIBER MEMBRANE SHEET-LIKE OBJECT, HOLLOW FIBER MEMBRANE SHEET LAMINATE, METHOD OF MANUFACTURING HOLLOW FIBER MEMBRANE SHEET LAMINATE, HOLLOW FIBER MEMBRANE MODULE AND METHOD OF MANUFACTURING HOLLOW FIBER MEMBRANE MODULE

TECHNICAL FIELD

The present invention relates to a hollow fiber membrane sheet-like object used for separation and purification of a liquid, solid-liquid separation, and the like, a method of manufacturing the hollow fiber membrane sheet-like object, a hollow fiber membrane sheet laminate in which a plurality of hollow fiber membrane sheet-like objects is stacked, a method of manufacturing the hollow fiber membrane sheet laminate, a hollow fiber membrane module including the hollow fiber membrane sheet-like object, and a method of manufacturing the hollow fiber membrane module. This application is based upon and claims the benefit of priority from the prior Japanese Patent Application No. 2014-077234, filed on Apr. 3, 2014, the entire contents of which are incorporated herein by reference.

BACKGROUND ART

For example, a module having a form in which a housing for water catchment is provided at end portions of a plurality of hollow fiber membrane has been known as a hollow fiber membrane module used to manufacture sterile water, drinking water, highly pure water, etc. (for example, see Patent Literature 1).

For example, such a hollow fiber membrane module may be manufactured using the following method.

First, a plurality of hollow fiber membranes is aligned, and end portions thereof are put in a container. Subsequently, liquid resin for fixing is injected into the container and hardened to fix and integrate the end portions of the hollow fiber membranes, thereby forming a hollow fiber membrane bundle (a first fixing process). Subsequently, the container is removed from the hollow fiber membrane bundle, a portion of the hollow fiber membranes integrated by the resin for fixing is cut altogether with the resin, and the hollow fiber membrane bundle in which the end portions of the respective hollow fiber membranes are open is obtained (a cutting process). Thereafter, the open end portions of the hollow fiber membrane bundle are inserted into the housing, and then resin for attachment is poured and hardened (a second fixing process). In the cutting process, the portion integrated by the resin may be cut altogether with the container without removing the container.

CITATION LIST

Patent Literature

Patent Literature 1: JP 2009-18283 A

SUMMARY OF THE INVENTION

Problem to be Solved by the Invention

However, such a method of manufacturing the hollow fiber membrane module is complicated since a time-consuming process of injecting and hardening resin needs to be performed twice in the first fixing process and the second process.

In addition, both the container removed in the cutting process and the portion cut out in the cutting process are discarded, and thus a waste of resources has been present.

The invention has been conceived in view of the above circumstances, and an object of the invention is to provide a method of manufacturing a hollow fiber membrane module which can reduce the number of processes of injecting and hardening resin to only one, achieves simplicity, and reduces a waste of resources, the hollow fiber membrane module manufactured by the manufacturing method, a hollow fiber membrane sheet-like object used to manufacture the hollow fiber membrane module, a method of manufacturing the hollow fiber membrane sheet-like object, a hollow fiber membrane sheet laminate in which a plurality of hollow fiber membrane sheet-like objects is stacked, and a method of manufacturing the hollow fiber membrane sheet laminate.

Means for Solving Problem

[1] A hollow fiber membrane sheet-like object in which a plurality of hollow fiber membranes is aligned in parallel with each other and fixed to each other while both end faces of each of the hollow fiber membranes in a longitudinal direction are open, wherein at least one belt-like binding portion made of an elastic body having an elongation percentage (E) stipulated by JIS K6251 of 100% or more and extending in a direction perpendicular to the longitudinal direction is formed at each of both end portions of the hollow fiber membrane sheet-like object, and the plurality of hollow fiber membranes is fixed to each other.

[2] The hollow fiber membrane sheet-like object according to [1], wherein a durometer hardness stipulated by JIS K6253 of the elastic body is in a range of A10 to 95.

[3] The hollow fiber membrane sheet-like object according to [2], wherein the elastic body is thermoplastic elastomer.

[4] The hollow fiber membrane sheet-like object according to [3], wherein the thermoplastic elastomer is styrene elastomer.

[5] The hollow fiber membrane sheet-like object according to any one of [1] to [4], wherein two binding portions are formed at each of the both end portions of the hollow fiber membrane sheet-like object.

[6] The hollow fiber membrane sheet-like object according to any one of [1] to [5], wherein a distance between adjacent hollow fiber membranes is in a range of 0 to 1 mm in each of the binding portions.

[7] A method of manufacturing the hollow fiber membrane sheet-like object according to any one of [1] to [6], the method including a process (a) of aligning a plurality of hollow fiber membranes in parallel with each other, a process (b) of disposing and joining a belt-like object made of the elastic body in a direction perpendicular to the longitudinal direction at plurality of places of the plurality of aligned hollow fiber membranes, and a process (c) of cutting the plurality of hollow fiber membranes in the perpendicular direction at one or more places corresponding to a binding portion formed by joining the belt-like object or a portion around the binding portion, thereby obtaining at least one hollow fiber membrane sheet-like object.

[8] The method of manufacturing the hollow fiber membrane sheet-like object according to [7], wherein two belt-like objects are disposed to oppose each other so as to interpose the plurality of aligned hollow fiber membranes therebetween, and the respective belt-like objects are heated and heat-fused to the hollow fiber membranes in the process (b).

[9] A hollow fiber membrane module including at least one hollow fiber membrane sheet-like object according to any one of [1] to [6] and a pair of elongated housings in which openings are formed along a longitudinal direction, both end portions of the hollow fiber membrane sheet-like object being inserted into the openings and fixed, wherein the hollow fiber membrane sheet-like object is fluid-tightly fixed by resin inside the housings while only a binding portion provided closest to an end portion side at each end portion in the binding portions formed at the both end portions of the hollow fiber membrane sheet-like object is inserted into each housing from the opening.

[10] The hollow fiber membrane module according to [9], wherein two binding portions are formed at each of the both end portions of the hollow fiber membrane sheet-like object, and one of the two binding portions exposed from the housing in each end portion is formed at a position at which a distance L from the opening of each housing is in a range of 1 to 30 mm.

[11] The hollow fiber membrane module according to [9] or [10], wherein at least a pair of protruding stripe portions opposing each other to interpose the binding portion inserted into the housing therebetween is provided to extend along a longitudinal direction of the housing on an inner surface of the housing.

[12] The hollow fiber membrane module according to any one of [9] to [11], wherein the hollow fiber membrane module includes a plurality of hollow fiber membrane sheet-like objects, and the plurality of hollow fiber membrane sheet-like objects is attached to each other and included in a hollow fiber membrane sheet laminate.

[13] A method of manufacturing the hollow fiber membrane module according to any one of [9] to [12], the method including a process (d) of inserting at least one hollow fiber membrane sheet-like object into the housing from the opening such that only a binding portion provided closest to an end portion side at each end portion in the binding portions formed at the both end portions of the hollow fiber membrane sheet-like object is positioned inside the housing, and a process (e) of injecting a resin into the housing from the opening, hardening the resin, and fluid-tightly fixing the hollow fiber membrane sheet-like object inside the housing while an end face of each of hollow fiber membranes is open.

[14] The method of manufacturing the hollow fiber membrane module according to [13], wherein a hollow fiber membrane sheet laminate in which a plurality of hollow fiber membrane sheet-like objects is stacked and attached to each other is inserted into the housing from the opening in the process (d).

[15] A hollow fiber membrane sheet laminate in which a plurality of hollow fiber membrane sheet-like objects according to any one of [1] to [6] is stacked, and adjacent hollow fiber membrane sheet-like objects are attached to each other by a dot-shaped dot adhesive portion provided between the hollow fiber membrane sheet-like objects, wherein a plurality of dot adhesive portions is provided at each of both end portions of each of the hollow fiber membrane sheet-like objects along a longitudinal direction of binding portions formed at the both end portions of each of the hollow fiber membrane sheet-like objects to attach hollow fiber membranes of adjacent hollow fiber membrane sheet-like objects to each other at a position around a binding portion provided closest to an end portion side at each of the end portions in the binding portions and on a center side in the longitudinal direction of the hollow fiber membranes from the binding portion.

[16] The hollow fiber membrane sheet laminate according to [15], wherein the dot adhesive portion is made of a thermoplastic resin.

[17] The hollow fiber membrane sheet laminate according to [16], wherein the thermoplastic resin is olefin resin.

[18] A method of manufacturing the hollow fiber membrane sheet laminate according to any one of [15] to [17], the method including a process (f) of preparing a hollow fiber membrane sheet-like object, and disposing a plurality of resins for forming dot adhesive portions in dot shapes at both end portions of the hollow fiber membrane sheet-like object along a longitudinal direction of binding portions formed at the both end portions on a hollow fiber membrane at a position around a binding portion provided closest to an end portion side at each of the end portions in the binding portions and on a center side in the longitudinal direction of the hollow fiber membrane from the binding portion, a process (g) of superposing another hollow fiber membrane sheet-like object on a side at which the resins of the hollow fiber membrane sheet-like object, in which the plurality of resins is disposed in the dot shapes, are disposed, and a process (h) of attaching hollow fiber membranes of the hollow fiber membrane sheet-like object to each other by cooling and solidifying or reactively curing the dot-shaped resins disposed in the process (f).

[19] The method of manufacturing the hollow fiber membrane sheet laminate according to [18], wherein a heated resin is disposed on the hollow fiber membrane and heat-fused to the hollow fiber membrane in the process (f).

Effect of the Invention

The invention may provide a method of manufacturing a hollow fiber membrane module which can reduce the number of processes of injecting and hardening resin to only one, achieves simplicity, and reduces a waste of resources, the hollow fiber membrane module manufactured by the manufacturing method, a hollow fiber membrane sheet-like object used to manufacture the hollow fiber membrane module, a method of manufacturing the hollow fiber membrane sheet-like object, a hollow fiber membrane sheet laminate in which a plurality of hollow fiber membrane sheet-like objects is stacked, and a method of manufacturing the hollow fiber membrane sheet laminate.

BRIEF DESCRIPTION OF DRAWINGS

FIG. 1 is a planar view illustrating an example of a hollow fiber membrane sheet-like object;

FIG. 2 is a planar view illustrating another example of the hollow fiber membrane sheet-like object;

FIG. 3 is a cross-sectional view taken along A-A' line of the hollow fiber membrane sheet-like object of FIG. 1;

FIG. 4 is a perspective view for description of a method of manufacturing a hollow fiber membrane sheet-like object;

FIG. 5 is a perspective view for description of a method of manufacturing a hollow fiber membrane sheet-like object;

FIG. 6 is a perspective view for description of a method of manufacturing a hollow fiber membrane sheet-like object;

FIG. 7 is a perspective view for description of a method of manufacturing a hollow fiber membrane sheet-like object;

FIG. 8 is a perspective view for description of a method of manufacturing a hollow fiber membrane sheet-like object;

FIG. 9 is a perspective view illustrating an example of a hollow fiber membrane sheet laminate;

FIG. 10 is a planar view of the hollow fiber membrane sheet laminate of FIG. 9;

FIG. 11 is a perspective view for description of a method of manufacturing the hollow fiber membrane sheet laminate;

FIG. 12 is a perspective view illustrating an example of a hollow fiber membrane module;

FIG. 13 is a cross-sectional view taken along B-B' line of the hollow fiber membrane module of FIG. 12;

FIG. 14 is a cross-sectional view partially illustrating another example of the hollow fiber membrane module;

FIG. 15 is a cross-sectional view partially illustrating still another example of the hollow fiber membrane module;

FIG. 16 is a cross-sectional view partially illustrating still another example of the hollow fiber membrane module;

FIG. 17 is a cross-sectional view partially illustrating still another example of the hollow fiber membrane module;

FIG. 18 is a cross-sectional view partially illustrating still another example of the hollow fiber membrane module; and FIG. 19 is a cross-sectional view for description of a method of manufacturing the hollow fiber membrane module.

MODE(S) FOR CARRYING OUT THE INVENTION

Hereinafter, the invention will be described in detail.

<Hollow Fiber Membrane Sheet-like Object>

FIG. 1 is a planar view illustrating an example of a hollow fiber membrane sheet-like object, FIG. 2 is a planar view illustrating another example of the hollow fiber membrane sheet-like object, and FIG. 3 is a cross-sectional view taken along A-A' line of the hollow fiber membrane sheet-like object of FIG. 1.

In the hollow fiber membrane sheet-like objects 1A and 1B of the examples of FIG. 1 and FIG. 2, a plurality of hollow fiber membranes 2 is aligned in parallel with each other, and is fixed to one another while both end faces 2a of each of the hollow fiber membranes 2 in a longitudinal direction are open.

In the hollow fiber membrane sheet-like objects 1A and 1B, belt-like binding portions 3a and 3b having a certain width and extending in a direction perpendicular to the longitudinal direction of the hollow fiber membranes 2 are formed in each of both end portions thereof (corresponding to both end portions of the respective hollow fiber membranes in the longitudinal direction), and the plurality of hollow fiber membranes 2 is fixed to one another by the binding portions 3a and 3b. In this example, the binding portions 3a and 3b are separately formed not to overlap each other in two rows in each of the respective end portions of the hollow fiber membrane sheet-like objects 1A and 1B, and are formed in four rows in total in each of hollow fiber membrane sheet-like objects 1A and 1B.

The binding portions 3a and 3b are made of an elastic body having an elongation percentage (E), which is stipulated by JIS K6251, of 100% or more.

When an elongated housing functioning as a water collecting pipe is installed in the hollow fiber membrane sheet-like objects 1A and 1B to manufacture a hollow fiber membrane module, each binding portion (hereinafter also referred to as a "first binding portion") 3a provided closest to the end portion side of the hollow fiber membrane sheet-like objects 1A and 1B in the binding portions 3a and 3b in two rows formed in each of the end portions is a portion inserted into the housing without protruding from the housing. Meanwhile, when the hollow fiber membrane module is manufactured, each binding portion (hereinafter also referred to as a "second binding portion") 3b provided on a center side of the hollow fiber membrane sheet-like objects 1A and 1B in the longitudinal direction in the binding portions 3a and 3b in two rows is a portion exposed from the housing without being inserted into the housing.

Since the first binding portion 3a is made of the elastic body having the elongation percentage (E) of 100% or more, the first binding portion 3a fluid-tightly adheres to an inner surface of the housing as described below in detail and exhibits a sealing property when the first binding portion 3a is inserted into the housing at the time of manufacturing the hollow fiber membrane module. As described above, when liquid resin for fixing the hollow fiber membrane sheet-like objects 1A and 1B inside the housing is injected into the housing in a state in which the first binding portion 3a is inserted into the housing while the first binding portion 3a exhibits the sealing property, the resin may be spread between hollow fiber membranes or between a hollow fiber membrane and the inner surface of the housing while preventing the resin from dripping up to a flow path (water catchment space) inside the housing ("resin dripping"). When the resin dripping occurs, the water catchment space of the housing and the open end faces of each of the hollow fiber membranes 2 (hereinafter also referred to as "open end faces") 2a are blocked, and a filtering function of the hollow fiber membrane module is impaired.

The second binding portion 3b is formed at a position exposed from the housing when the housing is installed in the hollow fiber membrane sheet-like objects 1A and 1B. For this reason, even if so-called "crawling up of resin" occurs when resin for fixing is injected into the housing after the first binding portion 3a of the hollow fiber membrane sheet-like objects 1A and 1B is inserted into the housing at the time of manufacturing the hollow fiber membrane module, the crawling up of resin may be inhibited by the presence of the second binding portion 3b, and crawling up of resin beyond the second binding portion 3b is prevented. The "crawling up of resin" refers to a phenomenon in which a capillary phenomenon occurs since the hollow fiber membranes 2 are densely concentrated, and thus resin crawls up toward a center side of the hollow fiber membranes 2 in the longitudinal direction along the hollow fiber membranes 2 when the resin is injected into the housing. A portion of the hollow fiber membranes 2 through which the resin crawls up has a surface coated with resin, and does not function as a membrane. For this reason, the crawling up of resin is preferably suppressed as much as possible.

In addition, the second binding portion 3b has a function of preventing membrane damage at the time of air scrubbing of the hollow fiber membrane module. In general, when the hollow fiber membrane module is immersed in a treatment water tank and filtered, air scrubbing for delivering air upward from a lower portion of the module is performed in order to prevent solid content such as sludge from adhering to a membrane surface. When such air scrubbing is performed, the hollow fiber membranes are intensely oscillated due to a generated gas-liquid mixed flow. In particular, the hollow fiber membranes are rapidly bent back and forth at a boundary between the portion coated by the crawling up of the resin and a portion which is not coated, and this portion is easily damaged. On the other hand, when the second binding portion 3b made of the elastic body having the elongation percentage (E) of 100% or more is provided, the second binding portion 3b reinforces the hollow fiber membranes 2, stress applied to the hollow fiber membranes 2 due to air scrubbing is mitigated, the hollow fiber membranes 2 is prevented from being rapidly bent back and forth, and membrane damage may be suppressed.

As described above, the second binding portion 2b functions as a stopper that inhibits crawling up of resin, and functions as a reinforcement and mitigation portion that reinforces the hollow fiber membranes 2 while mitigating stress applied to the hollow fiber membranes 2 at the time of air scrubbing.

Each of a width L1 of the first binding portion 3a and a width L3 of the second binding portion 3b is preferably falls within a range of 3 to 30 mm. When the widths are greater than or equal to a lower limit of the range, a joining portion between the respective binding portions 3a and 3b and the hollow fiber membranes 2 has sufficient strength, and the hollow fiber membrane sheet-like object 1A and 1B are rarely fractured. When the widths are less than or equal to an upper limit of the range, a decrease in membrane area due to formation of the respective binding portions 3a and 3b may be suppressed. Since the first binding portion 3a is a portion inserted into the housing such that the portion does not protrude from the housing, the width L1 of the first binding portion 3a is preferably determined in consideration of a size of the housing within the range of 3 to 30 mm.

The width L1 of the first binding portion 3a may be the same as or different from the width L3 of the second binding portion 3b.

In an example of FIG. 1, the first binding portion 3a is provided such that a one-side end face, which corresponds to one of both-side end faces of the first belt-like binding portion 3a, positioned closer to the end portion side of the hollow fiber membrane sheet-like object 1A is positioned on the same plane as that of one of the open end faces 2a of each of the hollow fiber membranes 2, that is, such that the one-side end face of the first binding portion 3a is flush with the open end face 2a of the hollow fiber membrane 2.

As in an example of FIG. 2, the first binding portion 3a may be provided such that the one-side end face is shifted from the open end face 2a of the hollow fiber membrane 2 by a distance L10 to the center side of the hollow fiber membrane 2 in the longitudinal direction, and an end portion of the hollow fiber membrane 2 protrudes outward from the first binding portion 3a by the distance L10. However, the hollow fiber membrane 2 corresponding to the protruding portion is a portion, which is buried in the housing and does not function as a membrane, as described below in detail when the hollow fiber membrane module is manufactured. Therefore, from the viewpoint of a membrane area, a length of the protruding hollow fiber membrane 2, that is, the distance L10 is preferably small, preferably 10 mm or less, and most preferably 0 as in a form of FIG. 1.

As described in the foregoing, the second binding portion 3b is formed at a position exposed from the housing when the hollow fiber membrane module is manufactured. For this reason, even though a formation location of the second binding portion 3b is determined based on the size of the housing, etc., the second binding portion 3b is normally provided to fall within a range of up to 5% from the end portion when a whole length of the hollow fiber membrane module is set to 100%. Although described in detail below, the second binding portion 3b is preferably formed at a position having a distance L of 1 to 30 mm from an opening of each housing.

As illustrated in FIG. 3, an inside of the first binding portion 3a and the second binding portion 3b is preferably formed such that space between the hollow fiber membranes 2 is densely filled with the elastic body without any gap.

When the first binding portion 3a is formed as described above, the above-mentioned sealing property is sufficiently exhibited, and the above-mentioned resin dripping may be further suppressed. When the second binding portion 3b is formed as described above, a function as a reinforcement and mitigation portion is more excellent.

In addition, referring to a surface 3c of the first binding portion 3a and the second binding portion 3b, both surfaces are preferably flat. In particular, when a surface of the first binding portion 3a is flat, as described below in detail, first binding portions 3a fluid-tightly adhere to each other without any gap, and a high sealing property is easily exhibited when the hollow fiber membrane module is manufactured by overlapping two or more hollow fiber membrane sheet-like objects 1A and 1B, and inserting the overlapped first binding portions 3a into the housing. In this way, resin dripping from a gap between the first binding portions 3a is prevented. In addition, when two or more hollow fiber membrane sheet-like objects 1A and 1B are overlapped and attached to each other to form a hollow fiber membrane sheet laminate described below, the first binding portions 3a fluid-tightly adhere to each other without any gap, and a high sealing property is easily exhibited.

In each of the first binding portion 3a and the second binding portion 3b, a thickness t1 of the elastic body that covers the hollow fiber membranes 2 is preferably in a range of 0.1 to 1 mm. When the thickness t1 is greater than or equal to a lower limit of the range, the joining portion between the elastic body and the hollow fiber membranes 2 has sufficient strength, and the hollow fiber membrane sheet-like object 1A and 1B are rarely fractured. When the thickness t1 is less than or equal to an upper limit of the range, the amount of the used elastic body is suppressed, and a cost is reduced. In addition, referring to the first binding portion 3a, when the hollow fiber membrane module is manufactured by overlapping two or more hollow fiber membrane sheet-like objects 1A and 1B, and inserting the overlapped first binding portions 3a into the housing, a membrane filling density per hollow fiber membrane module may be sufficiently increased. In addition, when two or more hollow fiber membrane sheet-like objects 1A and 1B are overlapped and attached to each other to form the hollow fiber membrane sheet laminate described below, and the hollow fiber membrane sheet laminate is used to manufacture the hollow fiber membrane module, a membrane filling density per hollow fiber membrane module may be sufficiently increased.

In each of the first binding portion 3a and the second binding portion 3b, a distance L4 between adjacent hollow fiber membranes 2 is preferably in a range of 0 to 1 mm. When the distance L4 falls within the range, the amount of the used elastic body with respect to the number of hollow fiber membranes 2 may be suppressed, and a cost may be reduced. In addition, the distance L4 between adjacent hollow fiber membranes 2 is more preferably in a range of 0 to 0.5 mm, and a membrane area per hollow fiber membrane sheet-like object may be sufficiently ensured.

The elastic body needs to be an elastic body having an elongation percentage (E), which is stipulated by JIS K6251, of 100% or more. The first binding portion 3a made of the elastic body having the elongation percentage (E) sufficiently exhibits the above-mentioned sealing property. In addition, the binding portion 3b made of the elastic body having the elongation percentage (E) sufficiently functions as a reinforcement and mitigation portion for preventing damage to the hollow fiber membranes due to air scrubbing. The elongation percentage (E) of the elastic body is more preferably 200% or more, and an effect that bending back and forth of the hollow fiber membranes is compensated for is further improved. The upper limit of the elongation percentage (E) is not particularly restricted. However the upper limit is normally about 600%.

The elastic body has a durometer hardness stipulated by JIS K6253 preferably in a range of A10 to 95. When the durometer hardness falls within the range, the second binding portion 3b has sufficient strength for preventing damage to the hollow fiber membranes 2 due to air scrubbing, and has a sufficient stress buffering effect. In addition, when the durometer hardness falls within the range, the first binding portion 3a sufficiently exhibits the above-mentioned sealing property. The durometer hardness of the elastic body is more preferably in a range of A40 to 90. When the durometer hardness is greater than or equal to A40, the amount of the used elastic body for obtaining sufficient strength of the first binding portion 3a and the second binding portion 3b may be suppressed, and thus a cost may be suppressed. When the durometer hardness is less than or equal to A90, flexibility of the second binding portion 3b increases, and thus the effect that damage to the hollow fiber membranes is prevented is further improved.

A standard of a durometer hardness of JIS K6253 corresponds to ISO 7619.

A material of the elastic body is preferably thermoplastic elastomer. A type of the thermoplastic elastomer may be selected according to an environment in which the hollow fiber membrane sheet-like objects 1A and 1B are used in consideration of a tolerance to the environment. Examples of the type include styrene elastomer (TPS), olefin elastomer (TPO), vinyl chloride elastomer (TPVC), ester elastomer (TPC), urethane elastomer (TPU), amide elastomer (TPA), etc., and one or more types among these examples may be used. Among these examples, styrene elastomer (TPS) is preferable in that rubber elasticity is high, and a chemical resistant property is excellent. In addition, the material of the elastic body used in the invention is not restricted to thermoplastic elastomer, and another material which has a suitable elongation percentage (E) and durometer hardness and can withstand a usage environment may be used. For example, a thermoplastic resin such as polyethylene (PE), polypropylene (PP), etc. may be used as the elastic body.

Examples of a material of the hollow fiber membranes include polysulfone resin, polyacrylonitrile, a cellulose derivative, polyolefin such as polyethylene or polypropylene, a fluorine-based resin such as polyvinylidene fluoride (PVDF) or polytetrafluoroethylene, polyamide, polyester, polymethacrylate, polyacrylate, etc., and resin containing one or more types among these examples may be used. In addition, a copolymer of these resins or a material in which a substituent is introduced to a part may be used.

<Method of Manufacturing Hollow Fiber Membrane Sheet-like Object>

The hollow fiber membrane sheet-like objects 1A and 1B may be manufactured by a method having processes (a) to (c) below.

Process (a): Process of aligning a plurality of hollow fiber membranes in parallel with each other.

Process (b): Process of disposing and joining belt-like objects made of an elastic body in a direction perpendicular to a longitudinal direction of the plurality of aligned hollow fiber membranes with respect to a plurality of places of the hollow fiber membranes 2.

Process (c): Process of obtaining at least one hollow fiber membrane sheet-like object by cutting the plurality of hollow fiber membranes in the direction perpendicular to the longitudinal direction of the hollow fiber membranes at one or more places of a binding portion formed when the belt-like objects are joined to the hollow fiber membranes and a portion around the binding portion.

In process (c), for example, the hollow fiber membrane sheet-like object 1A having the form of FIG. 1 is obtained when the hollow fiber membranes are cut in the binding portion. Further, for example, the hollow fiber membrane sheet-like object 1B having a form of FIG. 2 is obtained when the hollow fiber membranes are cut in the portion around the binding portion (a position other than the binding portion).

Specifically, a method capable of manufacturing a plurality of hollow fiber membrane sheet-like objects is preferable as described below with reference to FIGS. 4 to 8.

For example, as illustrated in FIG. 4, a pair of two fluted rollers 8 and 8 is rotated to wind supplied hollow fiber membranes 2 around the fluted rollers 8 and 8. In this way, the plurality of hollow fiber membranes 2 is aligned in parallel with each other (process (a)).

Subsequently, belt-like objects (tapes) made of an elastic body having an elongation percentage (E) or 100% or more are prepared, and disposed at a plurality of places of the plurality of aligned hollow fiber membranes 2 such that a longitudinal direction thereof is a direction perpendicular to the longitudinal direction of the hollow fiber membranes 2. In addition, as illustrated in FIGS. 8(a) to (c), for example, the belt-like objects 3' are heat-fused using a heating means such as an impulse heater 9, thereby being joined to the hollow fiber membranes 2 (process (b)). FIG. 4 is an example in which the belt-like objects are joined at three places in each of two regions separated in the longitudinal direction of the hollow fiber membranes 2, that is, at six places in total in process (b). FIGS. 8(a) to (c) illustrate a method of joining the belt-like objects 3' at each place.

A suitable mode of process (b) will be described in detail.

First, as illustrated in FIG. 8, two belt-like objects 3' are disposed to oppose each other at both sides of the hollow fiber membranes 2 to interpose the plurality of aligned hollow fiber membranes 2 therebetween at each place (FIG. 8(a)).

Subsequently, for example, the impulse heater 9, which has an upper portion 9a and a lower portion 9b and heats an object by allowing a current to instantaneously flow, is used to interpose the two belt-like objects 3' disposed to oppose each other therebetween from the outside on flat sealing surfaces of the upper portion 9a and the lower portion 9b. Subsequently, a current flows in the impulse heater 9, and both the two belt-like objects 3' are pressed while being heated from the outside (FIG. 8(b)).

In this way, the elastic body included in each of the belt-like objects 3' melts, flows, and spreads between the hollow fiber membranes 2.

Thereafter, the current of the impulse heater 9 is cut off, and a temperature of the elastic body is lowered by radiational cooling. After the elastic body solidifies, the upper portion 9a and the lower portion 9b are opened, and the impulse heater 9 is separated from the belt-like objects 3'. In this way, the binding portions 3a and 3b are formed (FIG. 8(c)).

Subsequently, as illustrated in FIG. 4, the plurality of hollow fiber membranes 2 is cut in the direction perpendicular to the longitudinal direction of the hollow fiber membranes 2 at one or more places in the binding portions 3a and 3b formed in process (c) or a portion around the binding portions 3a and 3b. In an example of FIG. 4, two places are cut along central lines (lines along a lengthwise direction) α1 and α2 of a binding portion 3a at a center among three arranged binding portions 3a and 3b formed using the belt-like objects.

In this way, two hollow fiber membrane sheet-like objects 1A having the form of FIG. 1 may be obtained.

As described above, a method of forming the binding portions 3a and 3b using the belt-like objects 3' made of the elastic body does not require a particular device, and may be simply performed. For example, in a method of forming a binding portion by supplying hot melt resin in a form of a belt to a hollow fiber membrane, a resin supply device such as a hot melt applicator is particularly needed, and an equipment cost increases.

As described above with regard to the binding portions 3a and 3b, a material made of an elastic body having an elongation percentage (E) of 100% or more may be used as a material of the belt-like objects 3'. Preferably, examples of the material include a tape made of thermoplastic elastomer such as TPS, TPO, TPVC, TPC, TPU, and TPA having durometer hardness in a range of A10 to 95.

When a thickness of the belt-like objects 3' is 0.15 to 0.25 times an outer diameter of the hollow fiber membranes 2, space between the hollow fiber membranes 2 is densely filled with the elastic body without any gap as illustrated in FIG. 3, and the hollow fiber membrane sheet-like objects 1A and 1B having the suitable thickness t1 are easily obtained. In addition, it is preferable that the thickness of the belt-like objects 3' satisfy the above-mentioned condition and fall within a range of 0.2 to 1 mm.

The heating means used in process (b) is not restricted. However, when the impulse heater 9 described above is used, heating, pressing, and cooling may be easily performed in a short time, and the binding portions 3a and 3b illustrated in FIG. 3 having the flat surface 3c is easily formed such that space between the hollow fiber membranes 2 is densely filled with the elastic body without any gap. For example, there is a scheme of performing heating using a hot plate obtained by maintaining a block of metal, etc. at a high temperature. However, in this scheme, a cooling mechanism is separately needed after heating the belt-like objects, and a device becomes complicated. On the other hand, the impulse heater 9 performs heating by allowing a current to instantaneously flow, and thus a temperature of a heated object is decreased in a relatively short time by cutting off the current even when the cooling mechanism is separately provided for cooling.

A cutting means used in process (c) is not particularly restricted when the cutting means can cut the hollow fiber membranes 2 while maintaining the opening without crushing the hollow fiber membranes 2 such that a cut section thereof is smooth, and it is possible to use a cutter knife, scissors, a guillotine cutter, a rotary cutter, an ultrasonic cutter, etc.

The example of FIG. 4 illustrates a method of collectively obtaining two hollow fiber membrane sheet-like objects 1A having the form of FIG. 1 by joining the belt-like objects 3' to the plurality of aligned hollow fiber membranes 2 at six places, and then appropriately cutting a plurality of places. However, the method of manufacturing the hollow fiber membrane sheet-like object of the invention is not restricted thereto.

For example, as illustrated in FIG. 5, belt-like objects may be joined at four places in each of two regions, that is, at eight places, and only the hollow fiber membranes 2 may be cut along lines α3 and α4, each of which divides four arranged binding portions 3a and 3b formed using the belt-like objects into two binding portions, thereby collectively obtaining two hollow fiber membrane sheet-like objects 1B having the form of FIG. 2. Alternatively, as illustrated in FIG. 6, belt-like objects may be joined at three places in each of four regions, that is, at twelve places, and the hollow fiber membranes 2 may be cut along lines α5 to α8, each of which corresponds to a central line of a binding portion 3a at a center among three arranged binding portions 3a and 3b formed using the belt-like objects, thereby collectively obtaining four hollow fiber membrane sheet-like objects 1A having the form of FIG. 1.

As described above, a plurality of hollow fiber membrane sheet-like objects having an arbitrary length may be collectively obtained by appropriately changing the number of formed binding portions, regions, etc. and by appropriately adjusting a roller diameter of the two used fluted rollers 8 and 8, a distance between the rollers, etc. according to a necessary length of the hollow fiber membrane sheet-like objects.

For example, as illustrated in FIG. 7, process (a) may be performed by a method of aligning the plurality of hollow fiber membranes 2 supplied from a creel device (not illustrated) while carrying the hollow fiber membranes 2 using one or more pairs of two nip rollers 10. According to this method, a plurality of hollow fiber membrane sheet-like objects may be continuously manufactured.

<Hollow Fiber Membrane Sheet Laminate>

FIG. 9 is a perspective view illustrating an example of a hollow fiber membrane sheet laminate of the invention in which a plurality of hollow fiber membrane sheet-like objects 1A of FIG. 1 is stacked, and adjacent hollow fiber membrane sheet-like objects 1A are attached and fixed to each other. A hollow fiber membrane sheet laminate 30 of this example is configured by stacking four hollow fiber membrane sheet-like objects 1A. FIG. 10 is a planar view of the hollow fiber membrane sheet laminate 30 of FIG. 9.

In the hollow fiber membrane sheet laminate 30 of this example, the adjacent hollow fiber membrane sheet-like objects 1A are stacked such that the hollow fiber membranes 2 are attached to each other by a plurality of dot-shaped dot adhesive portions 21 provided between the hollow fiber membrane sheet-like objects 1A. Specifically, the dot adhesive portions 21 are disposed at a position at which the hollow fiber membranes 2 are attached to each other in a position around the binding portion (first binding portion) 3a provided closest to the end portion side of the hollow fiber membrane sheet-like object 1A in the binding portions 3a and 3b formed in each of the both end portions and on a center side of the hollow fiber membranes 2 in the longitudinal direction from the first binding portion 3a. In this example, the dot adhesive portions 21 are disposed between the first binding portion 3a and the second binding portion 3b and the hollow fiber membranes 2 are attached to each other in each of the both end portions of the hollow fiber membrane sheet-like object 1A. In addition, the plurality of (three in this example) dot adhesive portions 21 is disposed along a longitudinal direction of the first binding portion 3a in each of the both end portions of the hollow fiber membrane sheet-like object 1A.

As described above, when the dot adhesive portions 21 are provided at a position at which the hollow fiber membranes 2 are attached to each other rather than at a position at which first binding portions 3a or second binding portions 3b of the adjacent hollow fiber membrane sheet-like objects 1A are attached to each other, the first binding portions 3a or the second binding portions 3b of the adjacent hollow fiber membrane sheet-like objects 1A may be allowed to adhere to each other without any gap. For this reason, when the hollow fiber membrane module is manufactured by inserting the first binding portions 3a of the obtained hollow fiber membrane sheet laminate 30 into the housing, the first binding portions 3a fluid-tightly adhere to each other without any gap, and thus a high sealing property is easily exhibited.

On the other hand, when a dot adhesive portion is provided at a position at which the first binding portions are attached to each other, and when the hollow fiber membrane sheet-like objects are stacked, a gap is generated between contact surfaces of the first binding portions due to a thickness of the dot adhesive portion. For this reason, at the time of manufacturing the hollow fiber membrane module, when the first binding portions of the obtained hollow fiber membrane sheet laminate are inserted into the housing, and liquid resin is injected, dripping of the resin from the gap (resin dripping) easily occurs, which is not preferably.

In addition, when a dot adhesive portion is provided at a position at which the second binding portions are attached to each other, and when the hollow fiber membrane sheet-like objects are stacked, a gap is generated between contact surfaces of the second binding portions due to a thickness of the dot adhesive portion. For this reason, a thickness of the obtained hollow fiber membrane sheet laminate is non-uniform in the second binding portions, which is not preferably.

As in this example, when the dot adhesive portions 21 are disposed on the hollow fiber membranes 2 at a position around the first binding portion 3a and on a center side from the first binding portion 3a in the longitudinal direction, a hollow fiber membrane module having excellent quality may be manufactured at a high yield using the obtained hollow fiber membrane sheet laminate 30.

When the dot adhesive portions are provided around the second binding portion, the dot adhesive portion attaches hollow fiber membranes to each other at a portion exposed from the housing in the hollow fiber membrane module after manufacturing in many cases. In this case, when the hollow fiber membranes oscillate, stress is concentrated on the dot adhesive portions to easily damage the membranes, and performance as the hollow fiber membrane module is degraded. In addition, even when the dot adhesive portions are provided between the first binding portion and the second binding portion to be included in the housing, if a position thereof is not around the first binding portion, the dot adhesive portions may be located at a position close to the opening of the housing, and the dot adhesive portions may disturb a flow of liquid resin at the time of injecting the resin into the housing. As a result, there is a possibility that a cavity at which the resin does not spread may be generated inside the housing, and a yield may decrease at the time of producing the hollow fiber membrane module.

On the other hand, when the dot adhesive portions 21 are disposed on the hollow fiber membranes 2 at a position around the first binding portion 3a and on a center side from the first binding portion 3a in the longitudinal direction, the above-mentioned problem does not occur, and a hollow fiber membrane module having excellent quality may be manufactured at a high yield.

The position around the first binding portion 3a refers to a portion in which a distance L20 illustrated in FIG. 10 measured along the longitudinal direction of the hollow fiber membranes 2 from a side end portion on a center side of the hollow fiber membranes 2 in the longitudinal direction in both side end portions of the first binding portion 3a is in a range of 0 to 10 mm. When the dot adhesive portions 21 are disposed to fall within the range, the dot adhesive portions 21 are positioned around the first binding portion 3a.

A diameter of one dot adhesive portion 21 in planar view is preferably in a range of 1 to 10 mm. The "diameter" refers to a diameter when the dot adhesive portion has a circular shape, and refers to a diameter of a circumscribed circle of the dot adhesive portion on the assumption of the circumscribed circle when the dot adhesive portion has a shape other than the circular shape.

A plurality of dot adhesive portions 21 is provided in each of the both end portions of the hollow fiber membrane sheet-like object 1A to stabilize a shape of the hollow fiber membrane sheet laminate 30. Even though it depends on a size of the hollow fiber membrane sheet-like object 1A, the number of dot adhesive portions provided in each of the end portions is preferably in a range of two to twenty, and more preferably in a range of three to ten. When the number falls within the range, the shape of the hollow fiber membrane sheet laminate 30 may be stably maintained. In addition, it is possible to suppress a quantity of the used dot adhesive portions 21 and processing time required for adhesion, and to suppress a cost.

A material of the dot adhesive portions 21 is preferably a thermoplastic resin. When the thermoplastic resin is adopted, the hollow fiber membranes may be attached to each other in an extremely short time and at a low cost using a glue gun available to a wide market.

A type of the thermoplastic resin may be selected according to an environment in which the hollow fiber membrane sheet laminate 30 is used in consideration of a tolerance to the environment. Examples of the thermoplastic resin include polycarbonate, polysulfone, polyolefin, PVC (polyvinyl chloride), acrylic resin, ABS resin, modified PPE (polyphenylene ether), etc., and one or more types among these examples may be used. Among the examples, olefin resin such as PE, PP, and EVA (ethylene-vinyl acetate copolymer) is preferable in that a toxic gas is rarely generated due to combustion, and a chemical resistant property is excellent.

The material of the dot adhesive portions 21 is not restricted to the thermoplastic resin, and it is possible to use thermoplastic elastomer and a thermosetting resin such as epoxy resin or polyurethane resin.

<Method of Manufacturing Hollow Fiber Membrane Sheet Laminate>

FIG. 11 is a perspective view illustrating a method of manufacturing the hollow fiber membrane sheet laminate 30 of FIG. 9 and FIG. 10. The hollow fiber membrane sheet laminate 30 may be manufactured by a method having processes (f) to (h) below.

Process (f): Process of preparing the hollow fiber membrane sheet-like object 1A, and disposing a plurality of resins 21' for forming the dot adhesive portions 21 in dot shapes at the both end portions of the hollow fiber membrane sheet-like object 1A along the longitudinal direction of the first binding portion 3a on the hollow fiber membranes 2 at a position around the first binding portion 3a formed at each of the both end portions of the hollow fiber membrane sheet-like object 1A and on a center side from the first binding portion 3a in the longitudinal direction of the hollow fiber membranes 2 as illustrated in FIG. 11(a).

In this example, three resins 21' are separately provided in each of the end portions.

In process (f), a glue gun including a nozzle 22 that discharges a required amount of heated resin is preferably used to supply and dispose the resins 21' to and on the hollow fiber membranes 2. A glue gun on the market may be used as the glue gun. When the glue gun is used, an operation of discharging a required amount of heated thermoplastic resin may be easily performed, and thus working hours for dot adhesion may be reduced.

Supplying and disposing of the resins 21' are not restricted to a method using the glue gun. For example, a dot adhesion operation may be performed by supplying thermosetting resin such as polyurethane resin using a syringe.

Process (g): Process of superposing another hollow fiber membrane sheet-like object 1A on a side at which the resins 21' of the hollow fiber membrane sheet-like object 1A, in which the plurality of resins 21' is disposed in the dot shapes, are disposed as illustrated in FIG. 11(b).

Process (h): Process of attaching the hollow fiber membranes 2 of the hollow fiber membrane sheet-like object 1A to each other by cooling and solidifying or reactively curing the dot-shaped resins disposed in process (f). In this way, the hollow fiber membrane sheet laminate 30 is obtained as illustrated in FIG. 11(c).

When thermoplastic resin is used as the resins 21', the resin is cooled and solidified through a temperature drop in process (h). When hardening resin such as thermosetting resin is used as the resins 21', the resin is heated and reactively cured through light radiation in process (h).

When process (f) to process (h) are repeatedly performed as necessary, it is possible to manufacture a hollow fiber membrane sheet laminate in which a plurality of hollow fiber membrane sheet-like objects 1A is stacked and attached to each other.

<Hollow Fiber Membrane Module>

FIG. 12 is a perspective view illustrating an example of the hollow fiber membrane module of the invention including the hollow fiber membrane sheet-like object 1A of FIG. 1, and FIG. 13 is a cross-sectional view taken along B-B' line of the hollow fiber membrane module of FIG. 12.

A hollow fiber membrane module 4A of this example includes four overlapped hollow fiber membrane sheet-like objects 1A and a pair of elongated housings 5a and 5b attached to both end portions of the four hollow fiber membrane sheet-like objects 1A. End portions of the overlapped hollow fiber membrane sheet-like objects 1A are inserted into each of the housings 5a and 5b, and the four hollow fiber membrane sheet-like objects 1A are fluid-tightly fixed inside the housings 5a and 5b by resin 6 for fixing.

In the hollow fiber membrane module 4A having this form, a treated liquid filtered by the hollow fiber membranes 2 is temporarily collected in a flow path along the longitudinal direction inside the housings 5a and 5b, that is, a water catchment space 7, and then extracted to the outside of the hollow fiber membrane module 4A through an intake 5c formed at an end of the housings 5a and 5b in a longitudinal direction.

The hollow fiber membrane module 4A of this example includes the four hollow fiber membrane sheet-like objects 1A. However, the hollow fiber membrane module of the invention may include one or more hollow fiber membrane sheet-like objects, and the number of hollow fiber membrane sheet-like objects may be one or an arbitrary number greater than or equal to two.

In the housings 5a and 5b of this example, a cross section perpendicular to a longitudinal direction thereof has a U-shape, and a slit-shaped opening 14 is formed along the longitudinal direction. Specifically, the housings 5a and 5b of this example has a pair of side wall portions 15a and 15b extending along the longitudinal direction and opposing each other, and a bottom portion 15c connecting the pair of side wall portions 15a and 15b to each other, and the opening 14 is formed at a position opposing the bottom portion 15c.

The four hollow fiber membrane sheet-like objects 1A are overlapped such that binding portions adhere to one another, specifically, such that first binding portions 3a adhere to one another and second binding portions 3b adhere to one another. In addition, in this overlapped state, the first binding portions 3a of the respective hollow fiber membrane sheet-like objects 1A are inserted into the housings 5a and 5b from the opening 14.

Stepped portions 16 along the longitudinal direction are formed at positions opposing each other on inner surfaces of the respective side wall portions 15a and 15b of the housings 5a and 5b of this example, and a distance (clearance) between the side wall portions 15a and 15b is smaller on the bottom portion 15c than on the opening 14 side with respect to the stepped portions 16 serving as a boundary. Further, the distance between the side wall portions 15a and 15b on the bottom portion 15c is set be substantially the same as or slightly smaller than a total thickness of the overlapped first binding portions 3a. In this way, when the overlapped first binding portions 3a are inserting up to the bottom portion 15c side from the stepped portions 16 as illustrated in FIG. 13, the first binding portions 3a fluid-tightly adhere to the inner surfaces of the side wall portions 15a and 15b, and exhibit a sealing property. In addition, the respective first binding portions 3a fluid-tightly adhere to one another, and exhibit a sealing property. In this example, the first binding portions 3a are inserted into the housings 5a and 5b such that the positions of the stepped portions 16 are identical to a position of a side end portion on the center side of the hollow fiber membranes 2 in the longitudinal direction in both side end portions of the belt-like first binding portion 3a.

When the sealing property is exhibited by the first binding portions 3a as described above, in the case in which a liquid resin 6 for fixing is injected into the housings 5a and 5b from the opening 14, the resin 6 fills only space on the opening 14 side from the first binding portions 3a or the stepped portions 16, and resin dripping does not occur in the water catchment space 7 on the bottom portion 15c side. In addition, the elastic body forming the first binding portions 3a is present between the hollow fiber membranes 2, and thus resin dripping does not occur downward through between the hollow fiber membranes 2. When a hollow fiber membrane sheet-like object not including the first binding portion is used, and a liquid resin is injected into a housing while an end portion thereof is inserted into the housing, the liquid resin passes through between the hollow fiber membranes or between the hollow fiber membrane and an inner surface of the housing, and resin dripping occurs. As a result, a water catchment space of the housing or an open end face of the hollow fiber membrane is blocked, and a filtering function of the hollow fiber membrane module is impaired.

As illustrated in FIG. 13, the second binding portions 3b are exposed from the housings 5a and 5b. Specifically, the second binding portions 3b are preferably located at a position at which a distance L from the opening 14 is in a range of 1 to 30 mm, and more preferably located at a position at which the distance L is in a range of 3 to 10 mm. As illustrated in the figure, the distance L refers to a length of a straight line along the hollow fiber membranes 2 from the opening 14 of the housings 5a and 5b to a side end portion on the end portion side of the hollow fiber membranes 2 in the longitudinal direction in both side end portions of the belt-like second binding portions 3b.

When the distance L is greater than or equal to a lower limit of the range, the opening 14 of the housings 5a and 5b is sufficiently separated from the second binding portions 3b. Thus, a sufficient opening is ensured when a liquid resin is injected into the housings 5a and 5b from the opening 14. As a result, the resin efficiently extrudes air inside the housing, and is smoothly injected in a short time while replacing air. When the distance L is less than the lower limit of the range, a sufficient opening cannot be ensured when a liquid resin is injected. As a result, the resin spills and thus is difficult to be injected, and injection requires time. In addition, when injection of the resin requires time as described above, a viscosity of the resin rises before the resin sufficiently spreads inside the housing. As a result, smooth injection of the resin becomes more difficult, a cavity in which the resin does not spread is formed inside the housing, and thus sealing is insufficient. Hence, a so-called leakage occurrence rate increases. When the leakage occurrence rate increases, a production yield of the hollow fiber membrane module is reduced. Meanwhile, the hollow fiber membrane positioned at a portion corresponding to the distance L do not function as a membrane. Thus, when the distance L exceeds an upper limit of the range, a membrane area of the hollow fiber membrane module is reduced, which is not preferable.

FIG. 14 is a cross-sectional view illustrating a part of another example of the hollow fiber membrane module of the invention. A hollow fiber membrane module 4B of FIG. 14 includes the hollow fiber membrane sheet-like object 1B having the form of FIG. 2 in which the hollow fiber membrane 2 extrudes from the first binding portion 3a. As described in the foregoing, the hollow fiber membrane 2 corresponding to the protruding portion is buried in the housing and does not function as a membrane. Therefore, the length thereof is preferably small, more preferably 10 mm or less, and most preferably 0 at which the hollow fiber membrane 2 does not protrude.

FIG. 15 is a cross-sectional view illustrating a part of still another example of the hollow fiber membrane module of the invention. The hollow fiber membrane module of FIG. 15 includes a housing, in which a cross section perpendicular to the longitudinal direction is formed in an H-shape, as housings 25a and 25b. Such housings 25a and 25b have a pair of leg portions 11 and 11 extending along the longitudinal direction and opposing each other. For this reason, a cross sectional secondary moment increases, and thus mechanical bending strength increases when compared to the housings 5a and 5b illustrating in FIG. 13 which does not having such leg portions. In addition, as described below, at the time of inserting the end portion of the hollow fiber membrane sheet-like object 1A into the housings 25a and 25b, when a force is applied in an arrow direction of the figure such that the leg portions 11 and 11 approach each other, an opening 14 of the housings 25a and 25b is sufficiently widened, and insertion of the hollow fiber membrane sheet-like object 1A becomes easy. In this example, a pair of ribs 17 and 17 extending along the longitudinal direction and opposing each other is provided on respective inner surfaces of the respective leg portions 11 and 11, and strength of the leg portions 11 and 11 is increased.

Alternatively, as illustrated in FIG. 16, a pair of side wall portions 15a and 15b of housings 35a and 35b may be formed such that a distance therebetween gradually increases from a bottom portion 15c side to an opening 14 side. When a portion 12 that gradually widens in this way is provided, a sufficient opening is ensured at the time of injecting a liquid resin into the housings 35a and 35b. In addition, the portion 12 functions as a weir that prevents the resin from spilling. For this reason, the resin may be easily injected in a short time.

Alternatively, as illustrated in FIG. 17, at least a pair of protruding stripe portions opposing each other to interpose a first binding portion 3a inserted into housings 45a and 45b therebetween may be provided to extend along a longitudinal direction of the housings 45a and 45b on inner surfaces of the housings 45a and 45b, specifically, inner surfaces of a pair of side wall portions 15a and 15b. FIGS. 17(b) to (d) illustrate enlarged views of a portion surrounded by a circle of FIG. 17(a). Examples of the protruding stripe portion include a protruding stripe portion 20a having a triangular cross section as illustrated in FIG. 17(b), a protruding stripe portion 20b having a rectangular cross section as illustrated in FIG. 17(c), a protruding stripe portion 20c having a semi-circular protruding stripe portion 20c as illustrated in FIG. 17(d), etc.

When such protruding stripe portions 20a, 20b, and 20c are provided, the protruding stripe portions 20a, 20b, and 20c cat into the first binding portion 3a of the hollow fiber membrane sheet-like object 1A to reliably hold the hollow fiber membrane sheet-like object 1A such that the hollow fiber membrane sheet-like object 1A is not shifted, and a hollow fiber membrane module, dimensions of which do not vary, may be stably produced.

Two pairs or more of protruding stripe portions may be provided, and the number of protruding stripe portions is not restricted. In addition, a protruding height of a protruding stripe portion is not particularly restricted, and may be appropriately determined according to a size of the housing, a thickness of the hollow fiber membrane sheet-like object, etc.

The hollow fiber membrane module of the above example includes four overlapped hollow fiber membrane sheet-like objects 1A and 1B. However, as illustrated in FIG. 18, the hollow fiber membrane module may include the above-described hollow fiber membrane sheet laminate 30 in which the hollow fiber membrane sheet-like objects 1A are attached to each other in advance using the dot adhesive portions 21.

The hollow fiber membrane sheet laminate 30 of this example is obtained by attaching hollow fiber membranes 2 of adjacent hollow fiber membrane sheet-like objects 1A to each other using the dot adhesive portion 21 provided at a position around the first binding portion 3a and on a center side of the hollow fiber membranes 2 in the longitudinal direction from the first binding portion 3a. When such a hollow fiber membrane sheet laminate 30 is used, the hollow fiber membranes 2 corresponding to a portion attached by the dot adhesive portion 21 are positioned inside housings 25a and 25b together with the first binding portion 3a. Referring to the hollow fiber membrane sheet laminate 30, both end portion sides of the hollow fiber membrane sheet-like objects 1A are attached to each other and integrated with each other, and shape stability is excellent. Thus, a treating property is excellent. For this reason, at the time of manufacturing the hollow fiber membrane module, an operation of inserting the hollow fiber membrane sheet laminate 30 into the housings 25a and 25b from the opening 14 may be more easily performed.

In addition, when the dot adhesive portion 21 is provided on the hollow fiber membranes 2 at a position around the first binding portion 3a and on a center side in the longitudinal direction from the first binding portion 3a as described in the foregoing, a hollow fiber membrane module having excellent performance may be manufactured at a high yield using the obtained hollow fiber membrane sheet laminate 30.

A material having mechanical strength and durability is preferably used as a material of the housing. Examples of the material of the housing include polycarbonate, polysulfone, polyolefin, PVC (polyvinyl chloride), acrylic resin, ABS resin, modified PPE (polyphenylene ether), etc., and a resin containing one or more types among these examples may be used.

Examples of a resin for fixing include epoxy resin, unsaturated polyester resin, polyurethane resin, a silicone-based filler, and various hot melt resins.

<Method of Manufacturing Hollow Fiber Membrane Module>

The hollow fiber membrane module may be manufactured by a method having processes (d) and (e) below.

Process (d): Process of inserting at least one hollow fiber membrane sheet-like object into a housing from an opening of the housing such that only a binding portion (first binding portion), which is provided closest to an end portion side at each of both end portions of the hollow fiber membrane sheet-like object in binding portions formed at the end portions, is positioned inside the housing.

Process (e): Process of injecting a resin into the housing from the opening of the housing, hardening the resin, and fluid-tightly fixing the hollow fiber membrane sheet-like object inside the housing while an end face of each hollow fiber membrane is open.

Hereinafter, the method of manufacturing the hollow fiber membrane module will be described with reference to FIG. 19 using a case, in which the housings 25a and 25b having the H-shaped cross section are used, as an example.

When the hollow fiber membrane module is manufactured using a plurality of hollow fiber membrane sheet-like objects, first, a plurality of hollow fiber membrane sheet-like objects 1A is stacked as illustrated in FIG. 19(a) in process (d). In this instance, the hollow fiber membrane sheet-like objects 1A are stacked such that first binding portions 3a of the respective hollow fiber membrane sheet-like objects 1A overlap each other, and second binding portions 3b of the respective hollow fiber membrane sheet-like objects 1A overlap each other. Subsequently, the hollow fiber membrane sheet-like objects 1A are inserted from the opening 14 of the housings 25a and 25b such that only the first binding portions 3a in the binding portions 3a and 3b of a laminate of the stacked hollow fiber membrane sheet-like objects 1A are positioned inside the housings 25a and 25b (FIGS. 19(b) and (c)). In this instance, when a force is applied such that leg portions 11 and 11 of the housing approach each other as illustrated in FIG. 19(b), the opening 14 of the housings 25a and 25b is sufficiently widened, and the laminate of hollow fiber membrane sheet-like objects 1A is easily inserted.

In addition, the first binding portions 3a are inserted and disposed to be included in a portion on a bottom portion 15c side from a stepped portion 16.

Subsequently, as illustrated in FIG. 19(d), in process (e), a resin 6 is injected from the opening 14 of the housings 25a and 25b into the housings, the resin 6 is hardened, and the hollow fiber membrane sheet-like objects 1A are fluid-tightly fixed inside the housings while an end face 2a of each hollow fiber membrane 2 is open. In this way, the hollow fiber membrane module may be manufactured. When the resin 6 is injected into the housings, a water catchment cap, a plug, etc. may be attached to both ends of the housings in advance according to shapes of the housings.

In process (d), a hollow fiber membrane sheet laminate 30 in which a plurality of hollow fiber membrane sheet-like objects 1A is stacked and attached to each other by the above-described dot adhesive portions 21 may be employed and inserted into the housings 25a and 25b.

In the above-described method of manufacturing the hollow fiber membrane module, an object fixed by a binding portion made of a particular elastic body is used as the hollow fiber membrane sheet-like object. For this reason, at the time of manufacturing the hollow fiber membrane module, a process of injecting and hardening a resin may be performed only once when the hollow fiber membrane sheet-like object is fixed to the housing, and processes may be simplified. In addition, fixing of hollow fiber membranes to each other at the time of obtaining the hollow fiber membrane sheet-like object is not performed by hardening a liquid resin. Thus, a process of cutting and opening a hollow fiber membrane corresponding to a portion fixed by resin is unnecessary, and processes are further simplified. In addition, since such a cutting process is unnecessary, a container conventionally used in this process is unnecessary. Further, a portion discarded due to cutting is not generated, and thus a resource waste may be avoided. Furthermore, while a specific cutting device is necessary in such a cutting process, cost of equipment and cost for maintenance are unnecessary.

As described in the foregoing, according to the invention, manufacturing processes may be simplified, and a hollow fiber membrane module may be manufactured at a low cost when compared to a conventional method of manufacturing a hollow fiber membrane module.

In the above invention, the first binding portion and the second binding portion are provided at each end portion as a binding portion formed in the hollow fiber membrane sheet-like object. However, when a hollow fiber membrane sheet-like object in which at least the first binding portion is provided is used, a hollow fiber membrane module may be manufactured using processes simplified as described above and without wasting a resource.

In addition, when a hollow fiber membrane sheet-like object in which the second binding portion is further provided is used, it is possible to manufacture a hollow fiber membrane module which has a sufficient membrane area by inhibiting resin from crawling up and can prevent membrane damage due to air scrubbing.

EXAMPLE

Hereinafter, an example with regard to the invention will be shown and described in detail.

Example

First, the hollow fiber membrane sheet-like object 1A having the form illustrated in FIG. 1 was manufactured. Referring to external dimensions of the hollow fiber membrane sheet-like object 1A, a width was 515 mm, and a length was 1,260 mm.

Specifically, as illustrated in FIG. 4, supplied hollow fiber membranes (a hole diameter is 0.1 μm, an external diameter is 1.65 mm, and an internal diameter is 1.1 mm) 2 made of PVDF were wound using the pair of two fluted rollers 8 and 8 and aligned in parallel with each other, and 280 hollow fiber membranes were arranged in a sheet shape.

Subsequently, as illustrated in FIG. 8, belt-like objects (tapes made of thermoplastic elastomer (styrene elastomer), a width of 10 mm, a thickness of 0.35 mm) 3', . . . , 3' were disposed on both surfaces of the hollow fiber membranes 2 aligned in the sheet shape at six places, the respective belt-like objects 3', ..., 3' were interposed by an impulse heater 9 having an upper portion 9a and a lower portion 9b from both sides, a current was allowed to flow to heat the belt-like objects 3', ..., 3', and the belt-like objects 3', ..., 3' were heat-fused to the hollow fiber membranes 2, thereby forming binding portions 3a and 3b. Referring to the impulse heater 9, after the current was cut off, an elastic body was cooled and solidified, and then the upper portion 9a and the lower portion 9b were opened.

Referring to styrene elastomer contained in the belt-like objects, an elongation percentage (E) stipulated by JIS K6251 was 550%, and durometer hardness stipulated by JIS K6253 was A80.

Subsequently, as illustrated in FIG. 4, the hollow fiber membranes 2 were cut altogether with binding portions 3a and 3a at centers among binding portions 3a and 3b, three of which were arranged as a set, along respective central lines α1 and α2 of the respective binding portions 3a and 3b. That is, two places were cut. In this way, two hollow fiber membrane sheet-like objects 1A having the form of FIG. 1 were obtained.

The above operation was repeated to manufacture a plurality of hollow fiber membrane sheet-like objects 1A.

In the manufactured hollow fiber membrane sheet-like objects 1A, a thickness t1 of an elastic body covering the hollow fiber membranes was 0.1 mm. With regard to one of the obtained hollow fiber membrane sheet-like objects 1A, a thickness of the elastic body was measured using a micrometer at three arbitrary places on each of two cut sections (first binding portions) obtained by the above-described cutting. Then, an average value thereof was set as the thickness t1.

In addition, referring to the hollow fiber membrane sheet-like objects 1A, the thickness t2 illustrated in FIG. 3 of each of the first binding portion 3a and the second binding portion 3b was 1.85 mm.

In addition, referring to each of the first binding portion 3a and the second binding portion 3b, fracture strength was 50 N when the first binding portion 3a and the second binding portion 3b were pulled in a direction perpendicular to the longitudinal direction of the hollow fiber membranes 2, and each of the first binding portion 3a and the second binding portion 3b had sufficient strength for handling.

Subsequently, a hollow fiber membrane module, in which a pair of housings is installed at both end portions, was manufactured using four hollow fiber membrane sheet-like objects 1A. Referring to external dimensions of the hollow fiber membrane module, a width was 600 mm, a height was 1,300 mm, and a depth was 13 mm.

A housing illustrated in FIG. 15 having an H-shaped cross section and a pair of leg portions 11 and 11 was used as the housings. In addition, as illustrated in FIG. 19, a force was applied such that the leg portions 11 and 11 approach each other to sufficiently widen an opening of housings 25a and 25b, and the four hollow fiber membrane sheet-like objects 1A were overlapped and inserted. After insertion, the force applied such that the leg portions 11 and 11 approach each other was removed. In this way, the hollow fiber membrane sheet-like objects 1A were held by the housings 25a and 25b. The housings 25a and 25b were provided at each of both end portions of the hollow fiber membrane sheet-like objects 1A.

Then, a water catchment cap and a plug were attached to both ends of the housings 25a and 25b.

Subsequently, a resin for fixing (urethane resin manufactured by Dai-ichi Kogyo Seiyaku Co., Ltd. "H7829-18") was injected into each housing from an opening of each housing and hardened, thereby manufacturing a hollow fiber membrane module. In this way, a hollow fiber membrane module in which the housings 25a and 25b are installed as illustrated in FIG. 19(a) was obtained.

The above operation was repeated to manufacture ten hollow fiber membrane modules.

As a result of observing the outsides of the ten hollow fiber membrane modules, in each of the hollow fiber membrane modules, crawling up of resin was reliably inhibited by the second binding portion 3b exposed to the outside of the housings 25a and 25b, and crawling up of resin was not observed on the center side of the hollow fiber membranes 2 in the longitudinal direction from the second binding portion 3b.

In addition, as a result of observing the insides of twenty housings among twenty housings having the ten hollow fiber membrane modules, resin dripping to the water catchment space and the open end face 2a of the hollow fiber membrane 2 was not observed.

After the ten hollow fiber membrane modules were immersed in an alcohol aqueous solution, a concentration of which is 30% by mass, and subjected to a hydrophilic treatment, the hollow fiber membrane modules were moved into water, air was supplied from an intake formed at an end of the housings 25a and 25b in the longitudinal direction such that an internal pressure of the hollow fiber membrane modules becomes 100 kPa, and a leakage test was conducted. As a result, in all the ten hollow fiber membrane modules, air leakage from the hollow fiber membrane modules was not observed, and a fixed portion of the housings 25a and 25b and the hollow fiber membranes 2 was found to be reliably sealed with resin.

From the above results, the invention indicates that a process of injecting and hardening resin may be performed only once when a hollow fiber membrane sheet-like object is fixed to a housing, a process of cutting and opening a hollow fiber membrane corresponding to a portion fixed by resin is unnecessary, and thus a container conventionally used in this process is unnecessary, and a hollow fiber membrane module free of leakage may be easily manufactured without generating a portion discarded due to cutting.

INDUSTRIAL APPLICABILITY

For example, a hollow fiber membrane module of the invention is suitably utilized for use that involves repeated pressurization and suction and requires high pressure resistance such as use for treating polluted water, for example, a secondary treatment and a tertiary treatment in a sewage treatment plant, solid-liquid separation in a septic tank, solid-liquid separation of suspended solid (SS) in industrial effluent, etc. in addition to use for manufacturing sterile water, drinking water, highly pure water, use for purifying air, etc.

EXPLANATIONS OF LETTERS OR NUMERALS 1A, 1B: hollow fiber membrane sheet-like object
2: hollow fiber membranes
2a: open end faces of hollow fiber membrane
3a: first binding portion
3b: second binding portion
3': belt-like objects
4A, 4B: hollow fiber membrane module
5a, 5b, 25a, 25b, 35a, 35b, 45a, 45b: housing
5c: intake 6: resin for fixing
14: opening
20*a*, 20*b*, 20*c*: protruding stripe portion
21: dot adhesive portions
22: nozzle

The invention claimed is:

1. A hollow fiber membrane module comprising
at least one hollow fiber membrane sheet-like object in which a plurality of hollow fiber membranes is aligned in parallel with each other and fixed to each other while both end faces of each of the hollow fiber membranes in a longitudinal direction are open,
    wherein at least one belt-like binding portion made of an elastic body having an elongation percentage (E) stipulated by JIS K6251 of 100% or more and extending in a direction perpendicular to the longitudinal direction is formed at each of both end portions of the hollow fiber membrane sheet-like object, and the plurality of hollow fiber membranes is fixed to each other and
a pair of elongated housings in which openings are formed along a longitudinal direction, both ends of the hollow fiber membrane sheet-like object being inserted into the openings and fixed,
wherein
    at least two binding portions are formed at each of the two ends of the hollow fiber membrane sheet-like object, wherein at least one of said at least two binding portions is said belt-like binding portion, the hollow fiber membrane sheet-like object is fluid-tightly fixed by resin inside each of the elongated housings while only a binding portion provided closest to an end portion side at each end portion in the binding portions formed at both ends of the hollow fiber membrane sheet-like object is inserted into each of the elongated housings, and each binding portion provided on a center side of the hollow fiber membrane sheet-like objects in the longitudinal direction in the binding portions in two rows is a portion exposed from each of the elongated housings without being inserted into either of the elongated housings, and
    one of the two binding portions exposed from each of the elongated housings in each end portion is formed at a position at which a distance L from the opening of each of the elongated housings are in a range of 1 to 30 mm.

2. The hollow fiber membrane module according to claim 1, wherein at least a pair of protruding stripe portions opposing each other to interpose the binding portion inserted into each of the elongated housings therebetween are provided to extend along a longitudinal direction of each of the elongated housings on an inner surface of each of the elongated housings.

3. The hollow fiber membrane module according to claim 1, wherein the hollow fiber membrane module includes a plurality of the hollow fiber membrane sheet-like objects, and the plurality of the hollow fiber membrane sheet-like objects is attached to each other and included in a hollow fiber membrane sheet laminate.

\* \* \* \* \*